Feb. 2, 1965  G. BERTOGLIO  3,167,977
MACHINE FOR PIERCING BALL PEN POINTS ON SIMILAR
ARTICLES OF MANUFACTURE
Filed Oct. 22, 1959  5 Sheets-Sheet 1

*INVENTOR*
Guido Bertoglio.

BY  Maxwell E. Sparrow

*ATTORNEY*

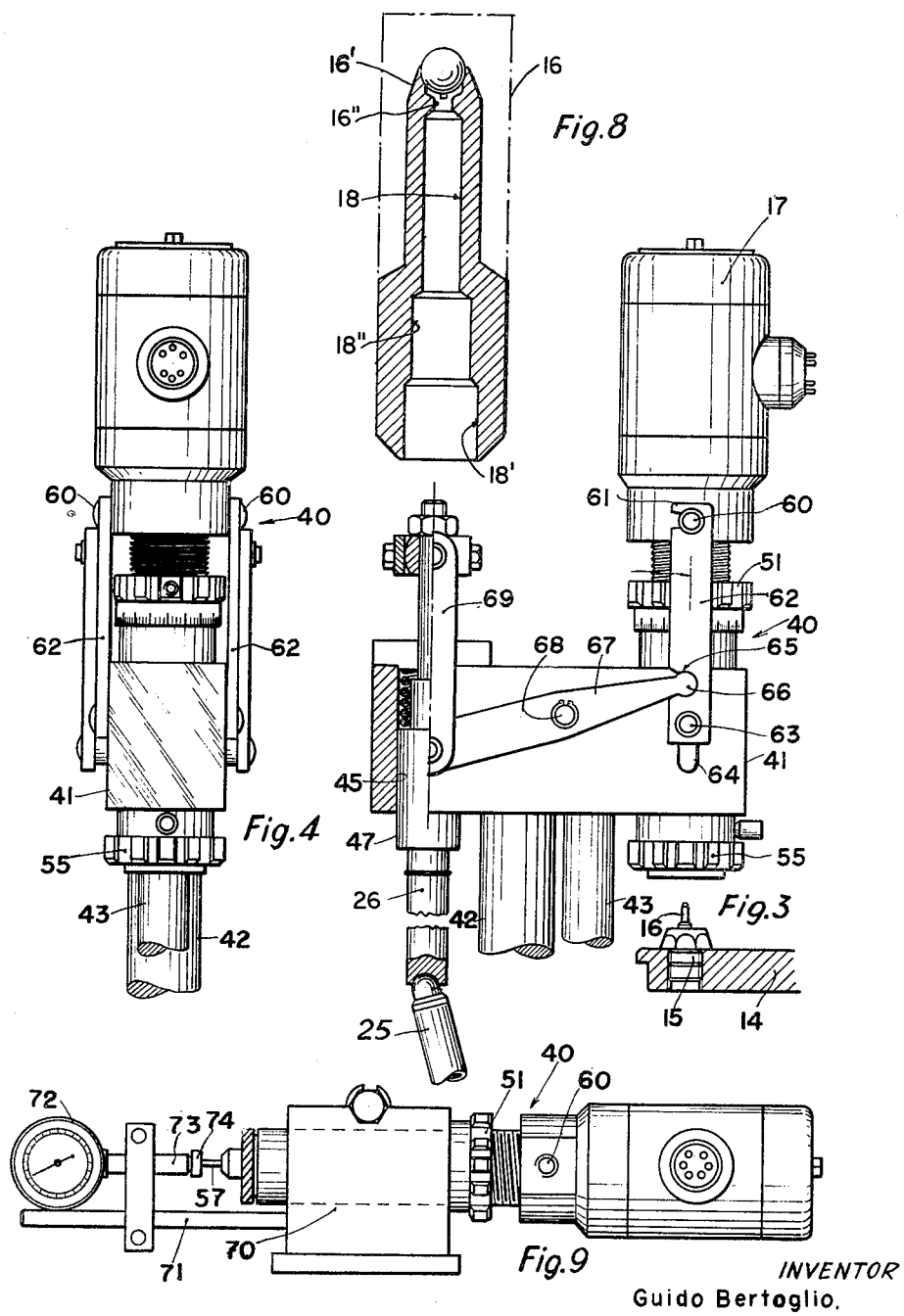

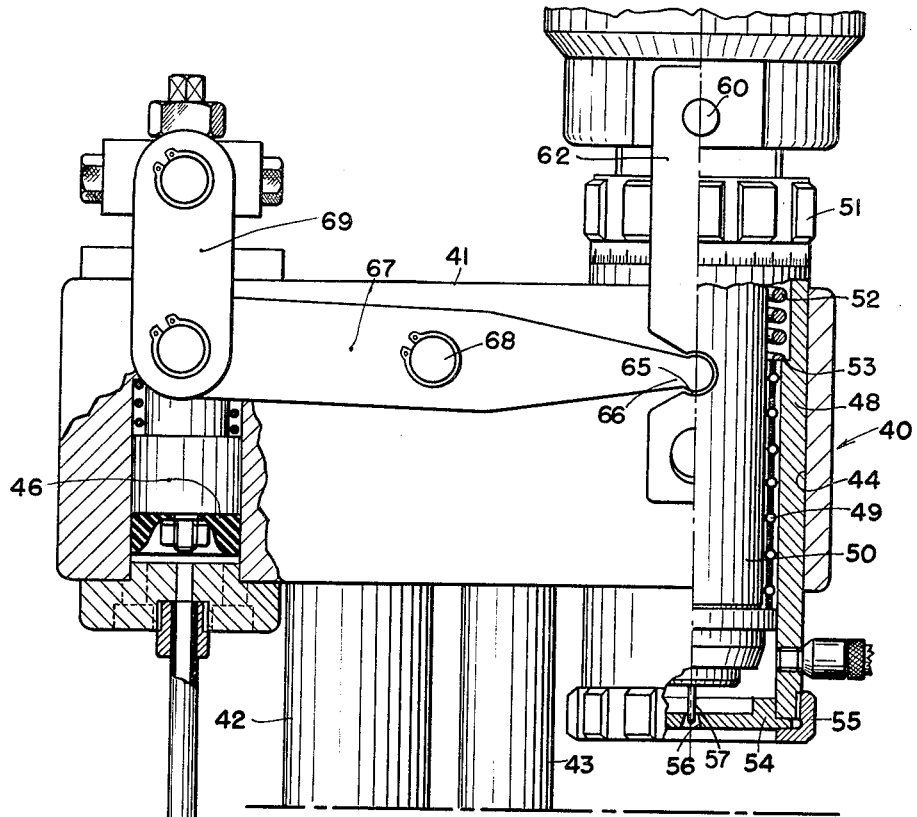
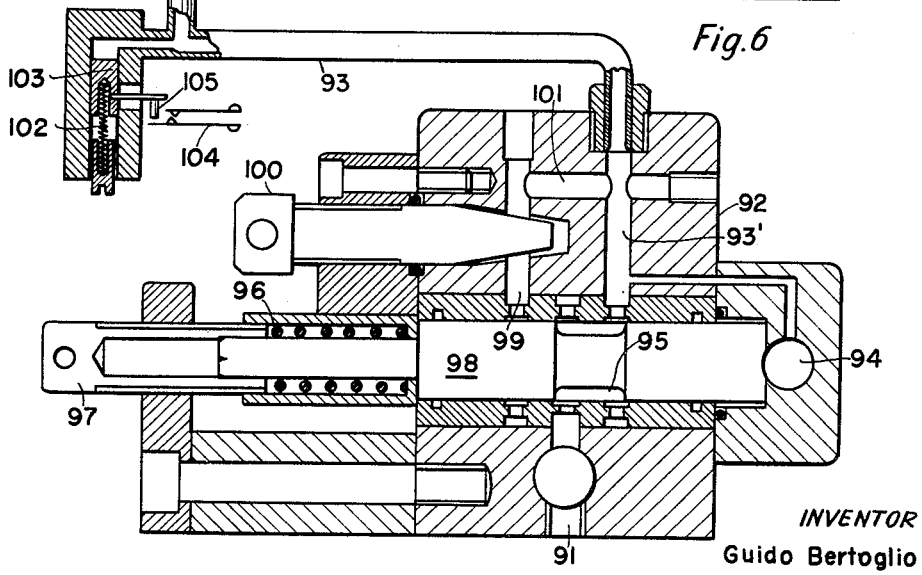
Fig. 6

United States Patent Office 3,167,977
Patented Feb. 2, 1965

3,167,977
MACHINE FOR PIERCING BALL PEN POINTS OR SIMILAR ARTICLES OF MANUFACTURE
Guido Bertoglio, Lugano-Viganello, Switzerland
Filed Oct. 22, 1959, Ser. No. 848,143
Claims priority, application Switzerland, Dec. 30, 1955, 28,336; Apr. 25, 1956, 32,551
2 Claims. (Cl. 77—5)

This invention relates to high precision machine tools, and particularly to special multiple drilling machines for manufacturing points of ball pens.

The conventional drilling or piercing machines for producing ball pen points which generally consist of brass, are not arranged for a high rate of production and do not have the high precision required for the operation of drilling the small holes in the ball pen points. It might be noted that for a perfect writing condition the tolerances of the drilled hole in the ball pen point must be in the order of 2 microns (.002 millimeter). Holes in ball pen points drilled on conventional machines usually have tolerances which are not better than 5 to 10 microns.

It is intended by this invention to provide for improved and new machine tools of this kind for the mass production of ball pen points or the like articles of manufacture at a very high precision, permitting tolerances not exceeding one micron. This application is a continuation in part of my co-pending application, Serial No. 613,182, filed on October 1, 1956, now abandoned.

The invention consists in such novel features, arrangements and combinations of parts as may be shown and described in connection with the apparatus herein disclosed by way of example only and as illustrative of a preferred embodiment.

Objects and advantages of the invention will be set forth in part hereafter and in part will be obvious herefrom or may be learned by practicing the invention, the same being realized and attained by means of the instrumentalities and combinations pointed out in the appended claims.

One of the objects of this invention is to provide for new and improved multiple operation means for mass-producing ball pen points.

A further object of the invention is to provide for a new high precision centering means for the precision drilling of very small holes.

Yet another object of this invention is to provide for a new and improved production means for ball pen points or the like articles of manufacture for an economic operation with very narrow tolerances.

Various further and more specific purposes, features and advantages will clearly appear from the detailed description given below taken in connection with the accompanying drawings which form part of this specification and illustrate merely by way of example one embodiment of the device of the invention.

In the following description and in the claims, parts will be identified by specific names for convenience, but such names are intended to be as generic in their application to similar parts as the art will permit. Like reference characters denote like parts in the several figures of the drawings.

FIG. 3 shows the side view of a drilling tool unit of the machine;

FIG. 4 is a front view of the tool unit shown in FIG. 3;

FIG. 6 shows the control device and the tool unit for a hydraulic operation of said tool unit;

FIG. 8 is an enlarged vertical section of a finished ball pen point;

FIG. 9 shows a device for the precision adjusting of the position of the drilling tool in the tool unit.

Figure 1:
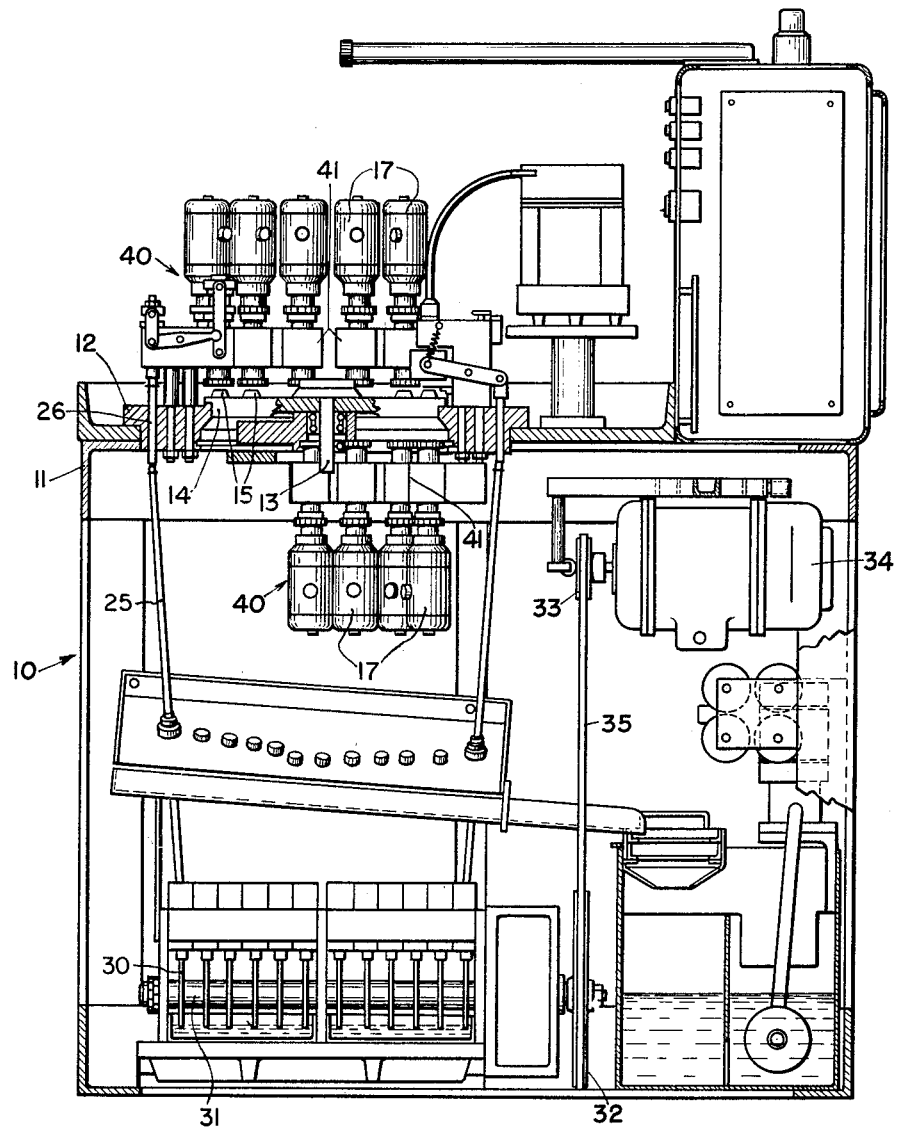
FIG. 1 is a vertical section of a multiple drilling machine, taken through the center line of the vertical axis of the rotating table carrying the ball pen points to be machined.
Figures 2, 5:
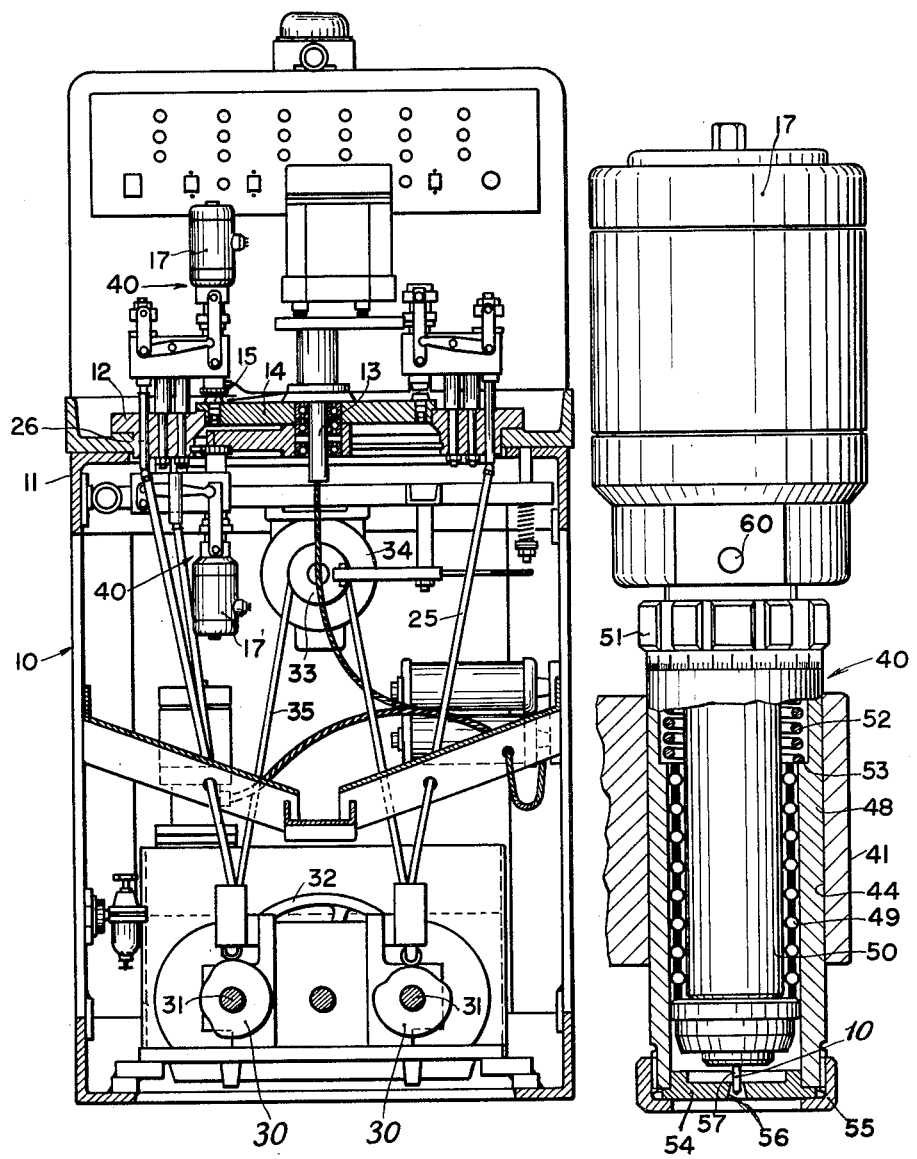
FIG. 2 is a vertical section of the machine shown in FIG. 1, taken perpendicularly to the section in FIG. 1.
FIG. 5 is a vertical section of the tool unit.
Figure 7:
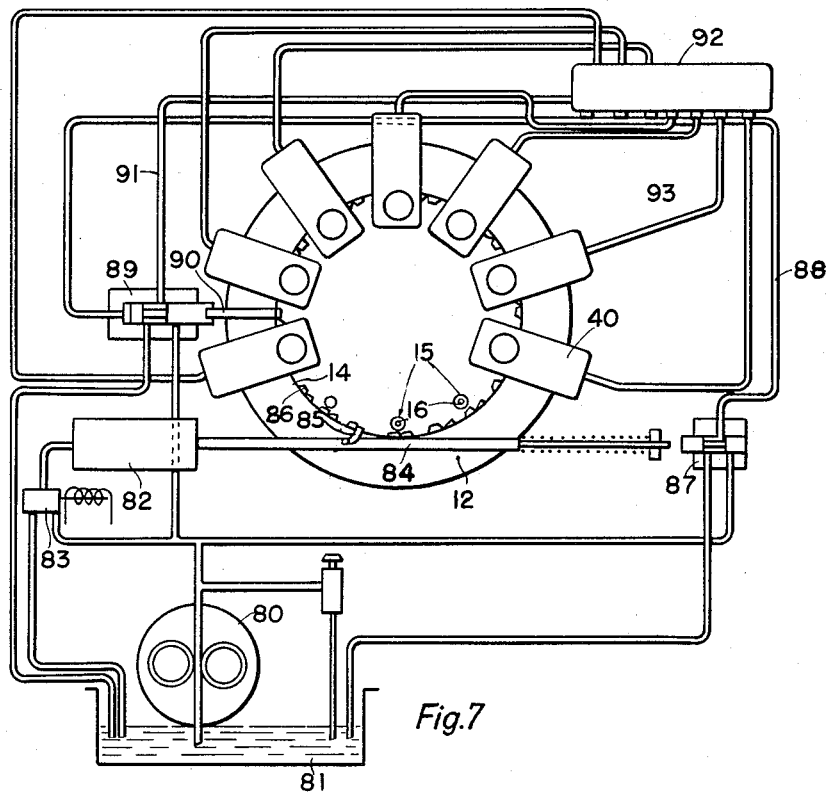
FIG. 7 is a diagram showing schematically the arrangement of the hydraulic circuits for operating the machine.

Referring now in more detail to the drawings illustrating a preferred embodiment by which the invention may be realized, there is shown in FIGS. 1 and 2 a multiple drilling machine 10 having a supporting frame 11 and a tool supporting platform 12 thereon. On this platform 12 an indexing table 14 is arranged rotatably about the vertical center shaft 13, which table 14 carries near its periphery a plurality of conventional chucking devices 15, each of which is designed to receive and hold a small workpiece 16, (FIGS. 3, 7 and 8). A plurality of tool units 40, each having its own motor 17, is arranged around the periphery of said indexing table 14, on both the upper and the lower side of the latter. Each tool unit 40 performs one machining operation on every workpiece 16 held in its corresponding chucking device when the latter is indexed from tool unit to tool unit in consecutive order until eventually the workpiece is completely finished. FIG. 8 illustrates a ball point pen tip showing how the upper parts 16' and 16" are machined by the upper tool units and the lower (and inner) parts 18', 18", and 18'" by the lower tool units, until a complete ball pen point is delivered.

The tool units 40 are operated either mechanically by means of a series of cams 30 or by hydraulic means, as shown in FIGS. 1, 2 and 3, and FIGS. 6 and 7, respectively. The cams 30, acting upon the tool units by means of tappets 25 and linkages 26, are mounted on a shaft 31 which is driven by a motor 34, means of pulleys 32, 33 and a belt 35. The hydraulic means will be explained in detail later.

The tool unit assembly is illustrated in FIGS. 3, 4, 5 and 6. It comprises a supporting block 41 mounted on columns 42, 43. This supporting block 41 has a vertical bore 44 for receiving the tool unit 40 proper and another vertical bore 45 for either the operating rod 47 (mechanical operation) or for the hydraulic piston 46 (hydraulic operation). The main part of the unit 40 consists of a sleeve 48 to which the electric motor 17 is attached. In the sleeve 48 is mounted on a ball bearing 49 the housing 50 of the motor-driven drill shaft, the drill shaft itself being not shown in the drawing. The permissible downward travel of this drill shaft housing 50 relative to the sleeve 48 is controlled by an adjustable micrometer screw collar 51. Compression spring 52 in the sleeve 48 bears at its lower end against shoulder 53 of the sleeve 48 and at its upper end against screw collar 51 to prevent longitudinal play between these two members.

On the lower end of the unit is a centering plate 54 held in place relative to the sleeve 48 and to the lower end of the housing 50 by a screw 55. The centering plate 54 has a cone-shaped hole 56 in its center, which is large enough to let the drill 57 or the like tool driven by motor 17 to pass through freely without touching. The upper cone-shaped contour 16' of the workpiece (FIG. 8) is machined prior to all drilling operations, and the cone 16' fits and is guided precisely into the center of cone-shaped hole 56. Thus, a perfect centering of the tool unit with the workpiece is achieved due to the mutual centering which takes place as the two elements are brought together. The drilling tool 57 which can pass freely through the cone-shaped hole 56, can not cause any wear and decreasing precision of the centering. Thus, a continuously satisfactory result can be obtained.

On the motor 17 are studs 60 which are engaged by the slotted upper ends 61 of levers 62. The levers 62 are pivotally mounted on studs 63, fixedly attached to the sleeve 48 which studs can slide up and down in slots 64 provided for in the block 41, whereby the length of these slots determines the total length of the vertical stroke of the tool unit 40. In the levers 62 are notches 65 engaged by the ends 66 of balancing levers 67 which are pivotally mounted at 68. The other ends of said balancing levers 67 are connected to links 69 which are attached to the cross head of the operating rod 47 or to a hydraulic piston 46.

For setting the tool 57 in the tool unit 40, there is a fixture 70 into which the unit 40 may be clamped. A rod 71 supporting a micro-dial gauge 72 having a shaft 73 extends from the fixture 70. By means of a calibrated end block 74 the tool 57 or the like can be set most accurately outside the machine (see FIG. 9). All tool units 40 are interchangeable with one another and can easily be taken out of the machine for resetting of the tool by merely disengaging the lever ends 61 and the motor studs 60. Thus, spare units can be prepared ahead of the time in order to keep the production flowing and to keep the downtime of the machine low.

The hydraulic operation of the machine is effected by the following means. A pump 80 is feeding hydraulic fluid from a container 81 into a cylinder 82 through an electro-magnetic valve 83. When this valve 83 is energized and opened the operating rod 84 is moved forward, indexing by a pawl 85, engaging ratchet teeth 86 of the indexing table 14. The manner in which the table 18 is indexed is not itself the subject of this invention. Any form of indexing is sufficient which brings the workpieces with reasonable accuracy into work positions where they may be operated on by the drills or other tools attached to the tool units. For example, the indexing equipment may take the form shown in FIGURE 6 of U.S. Patent 2,357,615. Other types of indexing equipment suitable for use in connection with this invention are currently available from such commercial sources as The Ferguson Company and Allen Air Corporation. When the end of the rod 84 operates the hydraulic valve 87 toward the end of its stroke, hydraulic fluid can pass through pipe line 88 to the distributor head 89 for operating the indexing table locking device 90. This operation in turn opens the pipe line 91 leading to the control head 92 for operating the tool units 40 by pipe leads 93 (FIG. 7). The hydraulic fluid entering the control head 92 through the feed line 91 passes through the bore 93' and through the pipe line 93 and acts directly on the piston 46, thus causing the tool unit 40 to move fast downwards until the centering plate 54 contacts by its cone-shaped bore 56 the upper part of the ball pen point to be drilled or pierced and thereby centers the unit 40 very accurately with this ball point pen. In other words, the final high-precision centering of the tool unit 40 takes place as the upper cone-shaped surface 16' of the workpiece enters and is guided by the cone-shaped aperture 56 of the centering plate 54. The effect of the cone-shaped aperture is to bring about a mutual centering between the centering plate and the workpiece to reduce almost to the vanishing point any minute deviations between the axis of the tool and the axis of the workpiece.

The rising pressure in the conduit 94, caused by the stopping of the tool unit 40, acts to overcome the force of the spring 96, which is adjustable by a screw means 97, and moves the piston 98 forward so that peripheral groove 95 opens conduit 99, whereas the end of the peripheral groove 95 closes the direct connection between feed line 91 and bore 93'. Hydraulic fluid now is fed through conduit 99, through the adjustable valve 100 and through bore 101 at a lower rate than before to the operating piston 46. The resulting slow motion is used for finalizing the machining operation on the workpiece 16 against the force of the spring 52. The depth of this operation had been set previously by adjusting the micrometer device 51. Thus, the tool unit 40 can not move any farther, and the rising pressure of the hydraulic fluid now can overcome the resistance of the spring 102 in the small piston 103. Hereby an electric contact 104 is opened by a pin 105, whereby the electromagnetic control valve 83 is opened. The hydraulic fluid can flow back into the container 81, the rod 84 and valve 87 return to their initial positions and the various other described mechanisms reset themselves by means of their springs. The system is now ready for the next operation.

While the invention has been described and illustrated with respect to a certain particular preferred example which gives satisfactory results, it will be understood by those skilled in the art after understanding the principle of the invention, that various other changes and modifications may be made without departing from the spirit and scope of the invention and it is intended therefore in the appended claims to cover all such changes and modifications.

What I claim is:

1. Apparatus for performing precise tooling operations on relatively small workpieces comprising:
   a chuck for gripping a workpiece;
   a tool unit having an operating tool attached thereto for performing an operation on a workpiece in said chuck;
   operating means for selectively reciprocating said tool unit along an axis to cause said operating tool to engage a workpiece held in said chuck thereby to perform a preselected operation upon such workpiece;
   precise centering means carried by and movable with said tool unit having tapered surfaces for engaging a workpiece as said operating tool moves toward such workpiece thereby to guide such workpiece to a precisely centered position with respect to said operating tool, said centering means being out of contact with said operating tool,
   means resiliently biasing the tapered surfaces of said centering means toward a normal position in advance of said operating tool to contact and center a workpiece before an operation is performed thereon by said operating tool, such that upon arrest of movement of said centering means by contact with a workpiece said operating tool continues its axial movement under the influence of said operating means and against the force of said biasing means to engage such workpiece; and
   micrometer means including adjustable abutment surfaces engageable between said tool unit and said centering means to limit the permissible axial movement of said operating tool with respect to said centering means.

2. Apparatus for performing precise tooling operations on relatively small workpieces comprising:
   a chuck for gripping a workpiece;
   a tool unit having an operating tool attached thereto for performing an operation on a workpiece in said chuck;
   means mounting said tool unit for reciprocation toward and away from said workpiece chuck to bring said operating tool into engagement with a workpiece mounted therein;
   a sleeve extending around the axis of movement of said tool unit;
   a centering fixture mounted on one end of said sleeve;
   spring bias means bearing against said tool unit and said sleeve and urging said centering fixture axially beyond said operating tool in a position to contact a workpiece in advance of said operating tool, said centering fixture having tapered surfaces for engaging a workpiece as said operating tool moves toward such workpiece thereby to guide such workpiece to a precisely centered position with respect to said operating tool, said centering fixture being out of contact with said operating tool; and micrometer means including relatively adjustable abutment surfaces on said tool unit and on said sleeve to limit the permissible axial movement of said operating tool with respect to said centering fixture against the force of said spring bias means.

References Cited in the file of this patent
UNITED STATES PATENTS

| | | |
|---|---|---|
| 173,027 | Leland | Feb. 1, 1876 |
| 2,073,111 | Lingren | Mar. 9, 1937 |
| 2,318,619 | Noel | May 11, 1943 |
| 2,357,615 | Stahlfauth | Sept. 5, 1944 |